(12) United States Patent
Bowring et al.

(10) Patent No.: US 12,233,470 B2
(45) Date of Patent: Feb. 25, 2025

(54) DEVICE AND METHOD FOR THERMAL JOINING, IN PARTICULAR FOR THERMAL JOINING OF A HEAT EXCHANGER FOR A MOTOR VEHICLE

(71) Applicant: Hanon Systems, Daejeon (KR)

(72) Inventors: David Bowring, Chelmsford (GB); Peter Friesen, Niederzier (DE); Felix Girmscheid, Cologne (DE); Robin Sluzalek, Cologne (DE); Andreas Britner, Cologne (DE)

(73) Assignee: HANON SYSTEMS, Daejeon (KR)

( * ) Notice: Subject to any disclaimer, the term of this patent is extended or adjusted under 35 U.S.C. 154(b) by 351 days.

(21) Appl. No.: 17/045,575

(22) PCT Filed: Apr. 26, 2019

(86) PCT No.: PCT/KR2019/005076
§ 371 (c)(1),
(2) Date: Oct. 6, 2020

(87) PCT Pub. No.: WO2019/209070
PCT Pub. Date: Oct. 31, 2019

(65) Prior Publication Data
US 2021/0094111 A1 Apr. 1, 2021

(30) Foreign Application Priority Data

Apr. 26, 2018 (DE) .................... 10 2018 110 050.7
Nov. 7, 2018 (DE) .................... 10 2018 127 807.1

(51) Int. Cl.
B23K 1/00 (2006.01)
B23K 1/002 (2006.01)
(Continued)

(52) U.S. Cl.
CPC ............ *B23K 1/0012* (2013.01); *B23K 1/002* (2013.01); *B23K 3/087* (2013.01); *B23K 37/04* (2013.01);
(Continued)

(58) Field of Classification Search
CPC .......... B23K 3/00; B23K 3/04; B23K 20/008; B23K 26/53; B23K 20/02; B23K 3/087; B23K 2101/02; B23K 1/0012
See application file for complete search history.

(56) References Cited

U.S. PATENT DOCUMENTS 3,378,914 A    4/1968   Miller
4,728,760 A *   3/1988   Brolin .................... B23K 20/14
                                                                 219/617
(Continued)

FOREIGN PATENT DOCUMENTS

DE    102016102162 A1    8/2017
JP       2014210279 A    11/2014
(Continued)

OTHER PUBLICATIONS

International Search Report issued in PCT/KR2019/005076 on Aug. 7, 2019.
(Continued)

*Primary Examiner* — Erin B Saad
(74) *Attorney, Agent, or Firm* — NORTON ROSE FULBRIGHT US LLP

(57) ABSTRACT

Device for thermal joining of a heat exchanger for a motor vehicle. The device has a first and a second locating elements and at least one heat source. The locating elements are designed with at least one thermal insulation and with mutually aligned contact surfaces for joining an object between them. At least one locating element is designed movably in relation to the other locating element. At least (Continued)

the first locating element has at least one thermal mass, which is heatable by means of the heat source. The second locating element has a support element with a contact surface for the object, while at least a first thermal mass of the first locating element has a contact surface for heating the object via heat conduction.

Method for thermal joining with the device. The use of the method for manufacturing a heat exchanger of plate elements for a motor vehicle.

20 Claims, 5 Drawing Sheets

(51) Int. Cl.
  *B23K 3/00* (2006.01)
  *B23K 3/08* (2006.01)
  *B23K 37/04* (2006.01)
  *B23K 101/14* (2006.01)

(52) U.S. Cl.
  CPC ..... *B23K 2101/14* (2018.08); *F28F 2275/064* (2013.01)

(56) References Cited

U.S. PATENT DOCUMENTS

| | | | |
|---|---|---|---|
| 4,741,393 A | 5/1988 | Collier | |
| 6,180,932 B1* | 1/2001 | Matsen | B23K 1/002 219/615 |
| 6,747,253 B1* | 6/2004 | Firth | H05B 6/105 219/634 |
| 6,914,225 B2* | 7/2005 | Fischer | A61K 47/60 219/634 |
| 9,016,342 B2 | 4/2015 | Kobayashi | |
| 9,358,703 B2* | 6/2016 | Matsen | B29C 70/446 |
| 9,469,087 B2* | 10/2016 | Matsen | B29C 33/06 |
| 9,662,742 B2* | 5/2017 | Matsen | B23K 20/129 |
| 10,029,398 B2* | 7/2018 | Matsen | B29C 70/345 |
| 2003/0106890 A1* | 6/2003 | Matsen | B29C 33/02 219/647 |
| 2004/0212109 A1* | 10/2004 | Fujimoto | B29C 33/02 264/1.32 |
| 2004/0222566 A1* | 11/2004 | Park | B29C 33/06 425/470 |
| 2011/0210117 A1* | 9/2011 | Yonenaga | C23C 16/46 219/634 |
| 2011/0248024 A1* | 10/2011 | Yonenaga | H01L 21/67303 219/634 |
| 2014/0196286 A1 | 7/2014 | Hong et al. | |

FOREIGN PATENT DOCUMENTS

| | | |
|---|---|---|
| JP | 2016200384 A | 12/2016 |
| KR | 20120102014 A | 9/2012 |
| WO | 2017198476 A1 | 11/2017 |

OTHER PUBLICATIONS

Office Action issued on Jun. 29, 2023 by the German PTO in the corresponding Patent Application No. 102018127807.1, with English translation.

* cited by examiner

DEVICE AND METHOD FOR THERMAL JOINING, IN PARTICULAR FOR THERMAL JOINING OF A HEAT EXCHANGER FOR A MOTOR VEHICLE

CROSS REFERENCE TO RELATED APPLICATIONS

This patent application is a national phase under 35 U.S.C. § 371 of International Patent Application No. PCT/KR2019/005076 filed Apr. 26, 2019, which claims the benefit of priority from German patent application Nos. 10 2018 110 050.7 filed Apr. 26, 2018, and 10 2018 127 807.1 filed Nov. 7, 2018, each of which is hereby incorporated herein by reference in its entirety for all purposes.

TECHNICAL FIELD

The invention relates to a device for thermal joining, in particular for thermal joining of a heat exchanger for a motor vehicle. The device has a first locating element and a second locating element as well as at least one heat source. The locating elements are designed with mutually aligned contact surfaces for arranging an object to be joined between the contact surfaces. The invention also relates to a method for the thermal joining of the object using the device according to the invention.

BACKGROUND ART

Methods for positive substance jointing known from the prior art include so-called brazing with process temperatures of at least 440° C. To heat the components to be joined, flame brazing or mechanised flame brazing in each case with a flux, furnace brazing with a flux or under inert gas atmosphere, dip brazing with a flux salt bath or vacuum brazing are used.

The above-mentioned processes involve the use of in some cases large quantities of flux and/or a mechanical treatment, such as brushing the components to be joined, for example to break up an oxide layer in the case of aluminium. Furthermore, working under a special atmosphere, such as vacuum or inert gas, is imperative in order to prevent a reformation of the oxide layer. In addition, very large areas are required for furnace brazing. Moreover, the conventional processes for positive substance jointing are based on the use of complex frame structures.

A conflict of objectives arises between the shortest possible duration of the process on the one hand and process reliability on the other. The components to be joined can have considerable temperature differences depending on the process and shape. In order to maintain the temperature profiles or time profiles in continuous furnaces, for example, additional steel elements and aluminium elements are used as thermal masses to equalise the temperatures, but this leads to increased energy consumption. A known profile of an object to be brazed comprises the steps of heating, soaking, brazing and cooling including set holding times, which results in a cycle time of around 20 minutes to 30 minutes.

Thus, for example, elements of heat exchangers, in particular plate elements of battery coolers, are manufactured using a controlled atmosphere brazing process, or CAB for short. The plate elements of battery coolers have larger dimensions as the size of the package of accumulators to be cooled increases. However, the size of the heat exchanger elements to be joined together is limited by the dimensions of the brazing furnace or CAB furnace. In addition, the surface quality of the heat exchanger elements is reduced as the size of the heat exchanger elements to be joined together increases, as a result of using conventional stainless steel brazing fixtures within the CAB brazing process. Furthermore, the brazing capacity of the CAB furnace decreases due to the high thermal mass of large brazing fixtures, which are required to accommodate the heat exchanger elements to be joined together. Alternative fixings of the heat transfer elements to be joined together, such as press-fitting or clinching, represent an additional process step and also deform the heat exchanger elements, which in turn creates a risk of leaks.

DISCLOSURE

Technical Problem

The task of the invention consists in providing a device and a method for thermal joining, in particular for thermal joining of a heat exchanger for a thermal management system of a motor vehicle. The device should enable an efficient manufacturing method with minimum energy and time expenditure as well as maximum process reliability. The joined elements should have a high quality, also with regard to deformation. The dimensions of the elements to be joined together should not be limited. The effort and costs of manufacturing the device and carrying out the method should be minimal.

Technical Solution

The task is solved by the objects having the features of the independent patent claims. Further developments are specified in the dependent patent claims.

The task is solved by device according to the invention for thermal joining, in particular for thermal joining of a heat exchanger for a motor vehicle. The device is designed with a first locating element and a second locating element as well as at least one heat source.

According to the concept of the invention, the locating elements in each case have at least one thermal insulation and are designed with mutually aligned contact surfaces for arranging an object to be joined between the contact surfaces. In addition, at least one of the locating elements is arranged movably with respect to the other locating element. The second locating element is designed with a support element having a contact surface for the object to be joined.

According to the invention, at least the first locating element has at least one thermal mass, which is heatable by means of the heat source. At least a first thermal mass of the first locating element is designed with a contact surface for the object for heating the object via heat conduction.

According to a further development of the invention, the heat source is arranged integrated inside the first locating element.

The heat source is advantageously formed of at least one induction coil, in particular of a plurality of independently controllable induction coils, which can respond to changes in the shortest time and have a high energy density. Alternatively, the heat source can also be designed as at least one electrical heating element or at least one radiation source or a plurality of heating elements or radiation sources.

The heat source is preferably arranged embedded in a thermal insulation of the first locating element.

The first locating element preferably has a first thermal insulation and a second thermal insulation, with the second thermal insulation being arranged adjacent to the first thermal insulation. The second thermal insulation, in turn, is advantageously formed from a first layer and a second layer.

The heat source can be arranged between the first layer and the second layer of the second thermal insulation.

According to a preferred design of the invention, at least the first thermal mass of the first locating element is plate-shaped with a flat contact surface for the object to be joined.

The first locating element can also have a second thermal mass, which is arranged between the first thermal mass and a thermal insulation. The first thermal mass and the second thermal mass are preferably formed of different materials. The second thermal mass of the first locating element can also have the form of a plate.

Another advantageous design of the invention consists in the support element of the second locating element being designed as thermal insulation or as thermal mass or as a combination of thermal mass and thermal insulation. In this case the locating element preferably has a layered arrangement.

The support element of the second locating element is preferably plate-shaped with a flat contact surface for the object to be joined.

According to another advantageous design of the invention, the first locating element is arranged immovably in relation to the second locating element of the device and the second locating element is arranged movably in relation to the first locating element in a direction of movement.

The first locating element can be arranged in a vertical direction above the second locating element and the second locating element can be adjustable in the vertical direction.

The contact surfaces of the locating elements are then preferably in each case arranged aligned in a horizontal plane.

According to a further development of the invention, spacer elements are arranged on the contact surface of the first thermal mass of the first locating element, which extend in the direction of the contact surface of the support element of the second locating element. The dimension of the spacer elements in the direction of the contact surface of the support element of the second locating element corresponds to the height of the object placed on the second locating element after the joining process.

The task is also solved by a method for thermal joining according to the invention, in particular for thermal joining of a heat exchanger for a thermal management system of a motor vehicle, using a device having the above-mentioned features. The method has the following steps:

- switch on a heat source and preheat a plate-shaped thermal mass of a first locating element of the device for thermal joining,
- place elements of an object to be joined touching each other onto a contact surface of a support element of a second locating element of the device,
- switch off the heat source or regulate the temperature to compensate for transferred heat and in a thermally contacting manner apply the first thermal mass with a contact surface onto the elements of the object to be joined,
- direct heating of the elements of the object to be joined by thermal contact with the adjacent first thermal mass via heat conduction and
- exert planarly applied pressure on the elements of the object to be joined arranged between the contact surfaces by pressing the locating elements together and reduce the temperature of the thermal mass below a predefined value as time progresses,
- remove the first thermal mass from the object and
- remove the joined object.

The application of the first thermal mass with a contact surface onto the elements of the object to be joined is also equivalent to a closing of the device. Likewise, the removal of the first thermal mass from the object can also be understood as an opening of the device.

With the closing of the device, the process steps for generating planarly applied pressure on the elements of the object to be joined arranged between the contact surfaces also begin, as well as the reduction of the temperature of the thermal mass. The steps run chronologically in parallel.

The elements of the object to be joined are preferably provided with a flux before being placed onto the contact surface of the support element.

According to a further development of the invention, with the switching on of the heat source, in addition to the thermal mass of the first locating element a plate-shaped thermal mass of the support element of the second locating element of the device is also heated. When the elements of the object to be joined are placed onto the contact surface of the support element, the elements of the object and the contact surface of the support element are thermally contacted.

According to a preferred design of the invention, in the thermal mass of the first locating element a voltage is induced and eddy currents generated by means of at least one induction coil.

Depending on the design of the invention, in the thermal mass of the support element of the second locating element, a voltage can be induced and eddy currents generated by means of at least one induction coil.

Another advantage of the invention consists in the power of an induction coil or the powers of a plurality of induction coils being controlled independently of each other.

The method according to the invention is preferably used to braze elements of a heat exchanger by means of conductive heat transfer. The elements of the heat exchanger are arranged and held between the two surfaces, designed as contact surfaces, of the locating elements. At the same time, the elements are pressed together to ensure contact between the contact surfaces of the device and the surfaces of the elements to be joined. One or more of the contact surfaces of the device which are designed as thermal masses are indirectly heated by means of one or more heat sources designed as induction coils. The heat sources are electrically operated. The heat is transferred via heat conduction to the surfaces of the elements to be joined.

The advantageous design of the invention enables the use of the device according to the invention and the method according to the invention for thermally joining and manufacturing a heat exchanger made of plate elements for a motor vehicle, in particular a battery heat exchanger for a thermal management system. Alternatively, in addition, objects with various geometries differing from plate elements of a heat exchanger, for example connecting elements or tubes, preferably flat tubes, can be manufactured.

A heat exchanger made of plate elements for a motor vehicle, which according to the concept is manufactured using the method according to the invention and the device according to the invention, in particular a battery heat exchanger for a thermal management system, has a wall made of a material having a silicon content of not more than 10%, in particular not more than 5%. To determine the silicon content, the wall strength of the base material is compared with the wall strength at the joining point, specifically at the brazing point.

Thus, for example, the brazing process is associated with a removal of material from the base material as a result of alloy formation. Brazing always requires the base material and a filler metal, where the filler metal is rolled onto the base material or added externally. The filler metal has a higher silicon content than the base material to set the melting temperature of the filler metal below the melting temperature of the base material.

Silicon diffusion therefore means that the base material is alloyed with silicon during the brazing process, which in turn involves a removal of the base material. The specifications for the silicon content therefore relate to the reduction of the original wall strength of the base material. The longer the brazing process takes and the higher the value of the brazing temperature, the greater the reduction in the wall strength of the base material in each case.

The wall of the heat exchanger, in a region of plastic deformation, preferably has grain size diameters in the range of 200 µm to 600 µm, in particular in the range of 200 µm to 400 µm.

The surfaces of the heat exchanger are advantageously formed flat and free of impressions, i.e. without plastic deformations, caused for example by press-fitting or clinching.

The device according to the invention and the method according to the invention for thermal joining have in summary further various advantages:
- very fast joining within a very short period of time compared to the conventional CAB process, which among other things also achieves the low silicon content—silicon diffusion into the joined object causes a weakening of the base material—hence reduced weakening of the material and reduced electrical conductivity,
- no brazing fixture required, only simple use of a clamping device,
- maximum flatness of the joined elements, in particular due to static positions of the elements during the process, and improved shaping of the final product, since no deformations for example caused by the use of brazing frames or press-fitting, hence increased quality of the surface and reduced risk of leakage,
- size of the elements not limited by dimensions of a brazing furnace, as in the conventional CAB process, therefore almost unlimited size of the elements to be joined and scaling to different dimensions and single part traceability,
- minimal use of flux, therefore also minimal flux residues outside the joined object,
- process possible in air or vacuum or inert gas atmosphere, inert gas atmosphere not required,
- component-controlled joining times with minimum energy and space requirements and maximum temperature homogeneity, therefore
- maximum process reliability and
- reduction in complexity and material costs and therefore reduced manufacturing costs.

BRIEF DESCRIPTION OF THE DRAWINGS

Further details, features and advantages of designs of the invention result from the following description of example embodiments with reference to the associated drawings.

MODE FOR INVENTION

Figure 1:
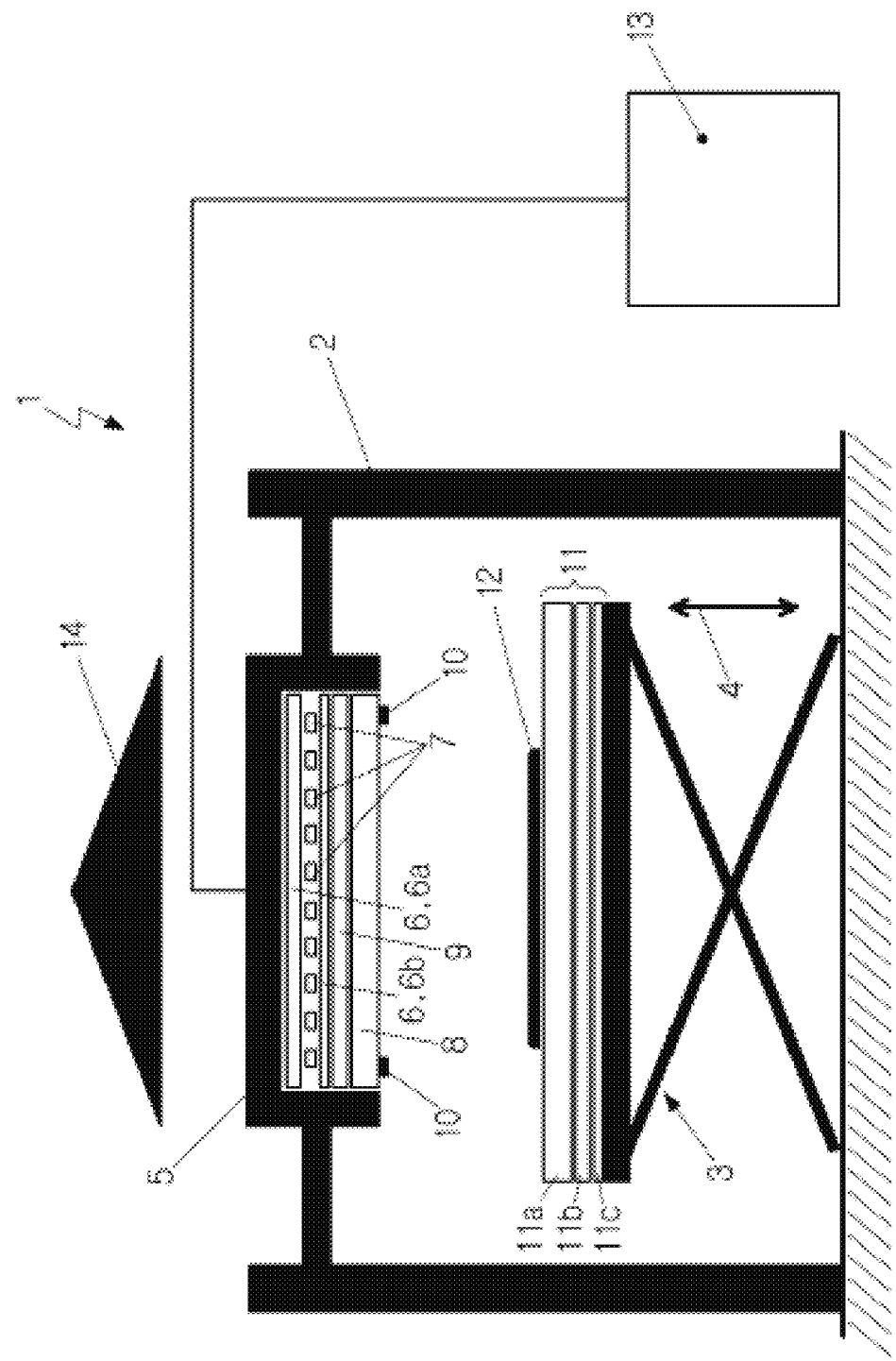
FIG. 1 shows a device for thermal joining, in particular for thermal joining of a heat exchanger for a thermal management system of a motor vehicle, in the opened state with an object to be joined placed on it.

FIG. 1 shows a device 1 according to the invention for thermal joining, in particular for thermal joining of a heat exchanger for a thermal management system of a motor vehicle, in the opened state with an object 12 to be joined placed on it.

The device 1 is formed of a first locating element 2 and a second locating element 3. The first locating element 2, arranged in a vertical direction essentially above the second locating element 3 is static and immovable specifically with respect to the second locating element 3. The second locating element 3 is designed movably in particular in relation to the first locating element 2. To move towards the first locating element 2, the second locating element 3 can be designed as a lifting platform or a support with an electric drive for adjusting the height and thus adjusting a contact surface. The object 12 to be joined is placed on a contact surface that is aligned upwards in the vertical direction and in a horizontal plane. The second locating element 3 is adjustable in the vertical direction in a direction of movement 4.

The first locating element 2 has a first thermal insulation 5, which at the same time is designed as a receptacle or holder for a layered arrangement of various components. In the vertical direction downwards on the first thermal insulation 5 a second thermal insulation 6, in particular a first layer 6a of the second thermal insulation 6, is provided, which touches the first thermal insulation 5 at the peripheral edge regions. In the further layered structure, there follows in the vertical direction downwards a heat source 7, which is embedded within the second thermal insulation 6, in particular between the first layer 6a and a second layer 6b of the second thermal insulation 6. The second thermal insulation 6 encloses the heat source 7, which is formed of a plurality of induction coils.

By means of the induction coils of the heat source 7, in a first thermal mass 8 arranged in the vertical direction below the heat source 7 and in a second thermal mass 9 arranged between the first thermal mass 8 and the second thermal insulation 6, in each case a voltage is induced and eddy currents are generated. As a result, the plate-shaped thermal masses 8, 9, each of which is aligned in a horizontal plane, are heated. The first thermal mass 8 is designed to evenly distribute heat within the object 12 to be joined. The second thermal mass 9 serves essentially to increase the efficiency of the device 1 during operation and to evenly distribute heat within the first thermal mass 8.

In the not shown closed state of the device 1, the first thermal mass 8 makes contact with the object 12 to be joined with an underside, preferably in a planar manner. The first thermal mass 8, on the underside, which is formed in the direction of the second locating element 3 with the object 12 placed on it, has spacer elements 10, whose dimensions in the vertical direction essentially correspond to the height of the object 12 placed on the second locating element 3. The spacer elements 10 are firmly attached in each case on an upper side to the first thermal mass 8 of the first locating element 2. In the closed state of the device 1, the spacer elements 10 in each case with an underside make contact with a surface of the second locating element 3.

The second locating element 3, which is adjustable in the direction of movement 4, is designed with a support element 11 for the object 12 to be joined. The support element 11, which is made up of individual layers 11*a*, 11*b*, 11*c*, can be made from a combination of thermal masses or thermal insulations as required. The support element 11 can have a third thermal mass 11*a*, 11*b*, 11*c* and/or a third thermal insulation 11*a*, 11*b*, 11*c*. The layers 11*a*, 11*b*, 11*c* are each aligned in a horizontal plane. The object 12 to be joined is arranged on an upper side of the top layer in the vertical direction.

The device 1 also has peripheral elements 13, such as a generator for the electrical operation of the heat source 7 and a water supply for cooling the thermal insulation 5, 6. In addition, the device 1 is designed with an extraction system 14 to extract from the device 1 vapours arising in particular during the joining process and air.

According to not shown embodiments of the device, at least one of the locating elements with at least one thermal mass can also be designed as a robot arm and therefore be designed movably in relation to the respective other locating element. If both locating elements are designed as robot arms, both locating elements can be arranged movably with respect to each other.

In the not shown closed state of the device 1, the object 12 to be joined is arranged between the first locating element 2 and the second locating element 3. The advantageously flat object 12, for example a plate element of a heat exchanger or a flat plate heat exchanger, in particular a battery cooler, lies with an upper side against the underside of the first thermal mass 8 of the second locating element 2 and with an underside against the upper side of the upper layer 11*a* of the second locating element 3, in each case preferably in a planar manner. With the device 1 furthermore objects with different geometries, also geometries deviating from a plate geometry, such as various connecting elements or tubes, preferably flat tubes, can be manufactured. Via the plate-shaped first thermal mass 8, the heat generated in the thermal mass 8 via induction with the heat source 7 is transferred by heat conduction to the object 12 to be joined. The flat contact between the first thermal mass 8 and the object 12 brings about an even heating of the object 12 and hence an even temperature distribution within the object 12 to be joined.

Furthermore, in addition, a third thermal mass 11*c* of the support element 11 can also be heated with the heat source 7 via induction. Since the object 12 to be joined and the third thermal mass 11*c* are also in flat contact with each other, the object 12 is then also evenly heated by the third thermal mass 11*c* and the even temperature distribution within the object 12 is brought about. The heat is transferred from the third thermal mass 11*c* to the object 12 to be joined by heat.

Figure 2:
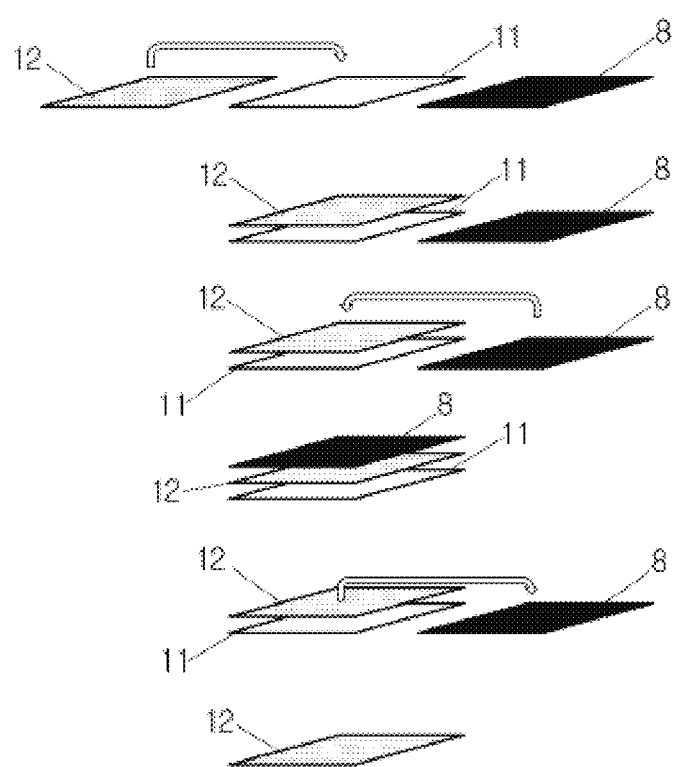
FIG. 2 shows steps of a process for thermal joining by means of the device shown in FIG. 1.

FIG. 2 shows steps of the process for the thermal joining of elements by heat conduction using the device 1 shown in FIG. 1.

In the first step, the elements of the object 12 to be joined, in particular the heat exchanger elements, are provided with a defined quantity of flux. At the same time, the plate-shaped first thermal mass 8 of the first locating element 2 is preheated. The heat source 7 is switched on. When the heat source is designed as induction coils, a voltage is induced and eddy currents are generated in the first thermal mass 8. Consequently, the first thermal mass 8 is indirectly heated by single or multiple induction heating, where the heating of the plate-shaped first thermal mass 8 is performed by individual or multiple independently controlled induction coils as an in-process temperature control. In each case the power of the induction coil or of the induction coils is controlled. Next, the overlaid elements of the object 12 to be joined are placed together onto the support element 11 of the movable second locating element 3. The layer 11*c* of the support element 11 can be designed as a third thermal mass or a third thermal insulation. The device 1 is opened.

After switching off the heat source 7, the first thermal mass 8 is applied in the vertical direction from above onto the elements of the object 12 which are overlaid and placed on the support element 11, making contact with the object 12. The movable second locating element 3 is guided in the direction of movement 4 in the vertical direction upwards to the first locating element 2. The device 1 is closed. While the object 12 to be joined is arranged between the locating elements 2, 3 with thermal contact to the adjacent first thermal mass 8 and the layer 11*a* of the second locating element 3, the object 12 is directly heated via heat conduction with the first thermal mass 8 and where applicable with the third thermal mass 11*c*. The third thermal mass 11*c* can be heated either by means of the heat source 7 of the first locating element 2 or via an induction coil or induction coils arranged in the vertical direction below the thermal mass 11*c* as additional heat sources. Alternatively, the third thermal mass 11*c* can be heated by direct thermal contact with the first thermal mass 8 via heat conduction. In addition, the third thermal mass 11*c* can be heated via an alternative heat source or via alternative heat sources, for example electric heating elements or radiation sources.

Furthermore, pressure is applied to the heat exchanger elements arranged between surfaces of the first thermal mass 8 and the layer 11*a* of the second locating element 3 as the elements of the object 12 to be joined together, in order to ensure contact between the surfaces of the elements to be joined. The pressure acts in a planar manner on the elements of the object 12.

As a result of switching off the heat source 7 before the step of applying the thermal mass 8, 11*c* to the object 12, the temperature of the thermal mass 8, 11*c* drops below a predefined value as time progresses. As an alternative to the step of switching off the heat source 7, the temperature of the thermal mass 8, 11*c* can be regulated also by means of the heat source 7 to compensate for transferred heat.

Once the predefined value of the temperature of the thermal mass 8, 11*c* is reached, the first thermal mass 8 is removed from the object 12. The movable second locating element 3 is guided in the direction of movement 4 in the vertical direction downwards and therefore away from the first locating element 2. The device 1 is opened.

The now thermally joined object 12 can be removed from the second locating element 3.

The aforementioned process steps of the thermal joining of the object 12 can also be carried out parallel to each other and can be adjusted to shorten the process time and/or to increase the quality of the produced object.

Figure 3:
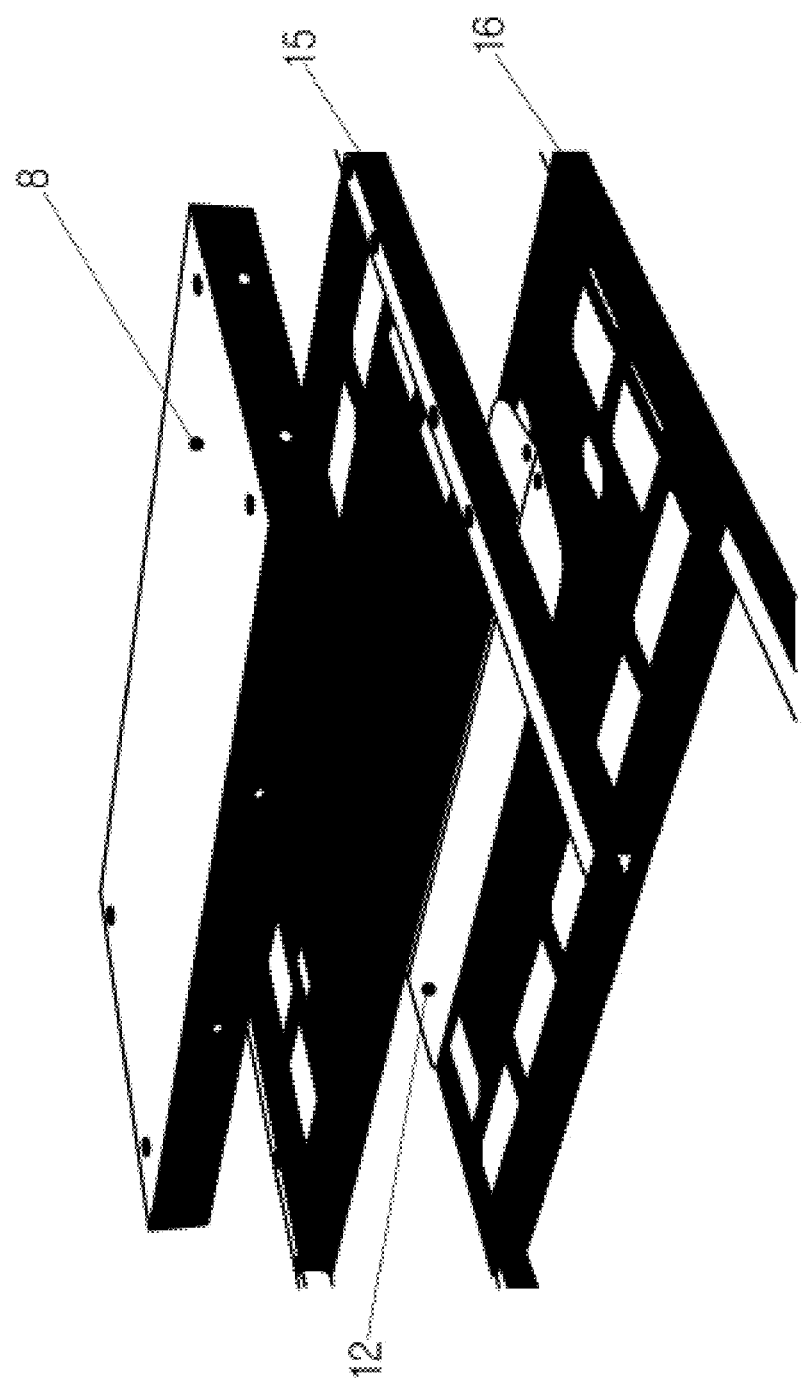
FIG. 3 shows perspective view of frame elements of the device shown on FIG. 1 in the opened state with the intermediately placed object to be joined.

FIG. 3 shows a perspective view of frame elements 15, 16 of a brazing fixture in the open state of device 1 for thermal joining with an intermediately arranged object 12 to be joined. The plate-shaped first thermal mass 8 of the device 1 is arranged in the vertical direction above a first frame element 15, while the object 12 is arranged for placing on the not shown third thermal insulation 11c between the frame elements 15, 16. The frame elements 15, 16 are placed with the intermediate object 12 with the second frame element 16 onto the second locating element 3, while the first frame element 15 is aligned in the direction of the first locating element 2. The frame elements 15, 16 therefore serve to fix and position the object 12 to be joined.

Figure 4A:
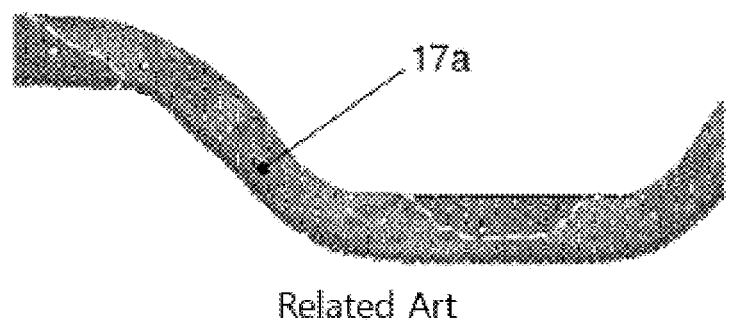
FIG. 4A shows a micrograph of a section of a wall of an object joined in conventional manner.
Figure 4B:
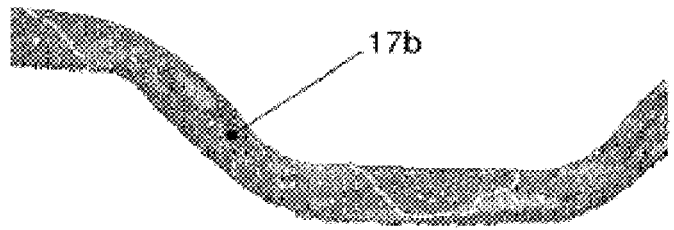
FIG. 4B shows a micrograph of a section of a wall of an object joined using the device shown on FIG. 1 and the method shown on FIG. 2.
Figure 5A:
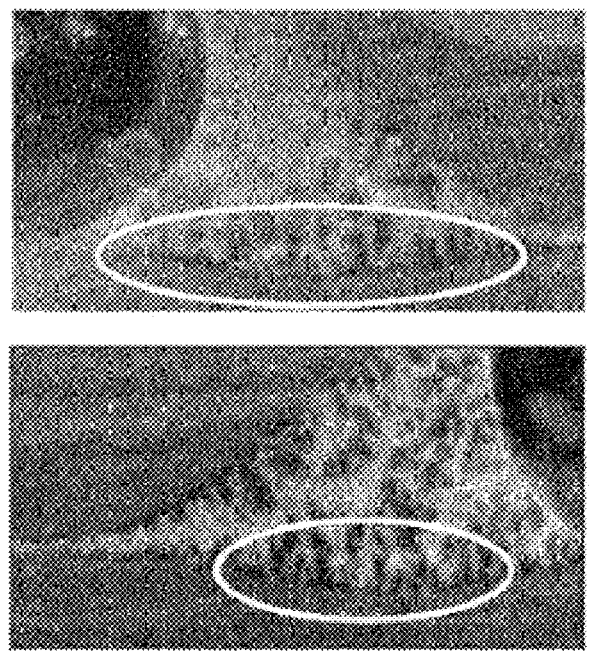
FIG. 5A shows a micrograph of details of a wall of an object joined in conventional manner.
Figure 5B:
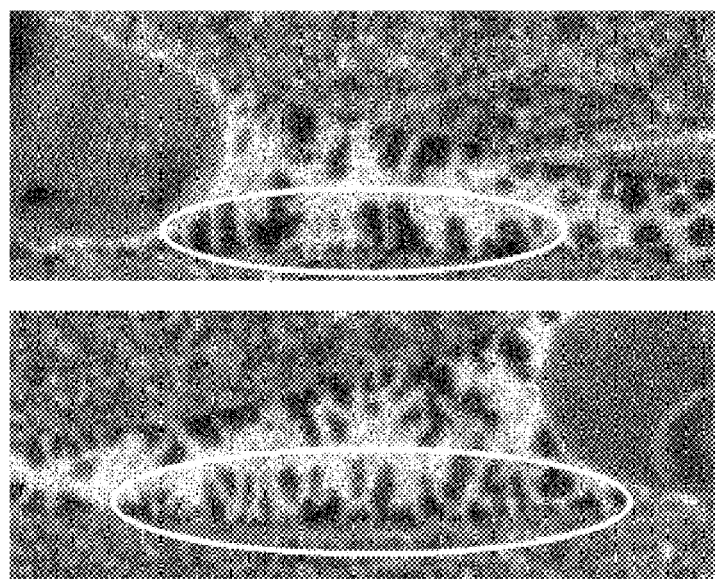
FIG. 5B shows a micrograph of details of a wall of an object joined using the device shown on FIG. 1 and the method shown on FIG. 2.

FIG. 4A and 4B as well as FIG. 5A and 5B in each case show micrographs of a wall of an object joined in conventional manner and of an object 12 joined using the device 1 shown in FIG. 1 and the method shown in FIG. 2 in comparison. In FIG. 4A and FIG. 5A micrographs of a section of a wall and respectively details of a wall of an object joined using a CAB brazing process known in the prior art can be seen, whereas FIG. 4B and FIG. 5B show micrographs of a section of a wall and respectively details of a wall of an object 12 joined using the device 1 according to the invention and the method according to the invention.

The micrographs of FIG. 4A and 4B illustrate regions 17a, 17b of plastic deformation of a bent sheet as a joined object 12, in which, as a result of cold deformation and the effect of temperature, recrystallisations occur, i.e. new grain formations and grain coarsenings. The magnitudes of the grain coarsenings and new grain formations, for example the grain size diameters within the region 17a of plastic deformation of the object joined in conventional manner are substantially larger than the magnitudes of the grain coarsenings and new grain formations within the region 17b of plastic deformation of the object 12 joined using the device 1 of FIG. 1 and the method of FIG. 2. With the device 1 according to the invention and the method according to the invention, in the region 17b of plastic deformation, specifically in the region of work hardening, grain size diameters in the range of 200 μm to 600 μm occur, whereas the grain size diameters in the region 17a of plastic deformation of the objects joined in conventional manner are in the range of 400 μm to 1200 μm. The diameter of the smallest circle enclosing a grain is referred to as the grain size diameter. The smaller the grain size diameter and consequently the finer the grains, the higher the strength, in particular the notch impact strength, and the toughness.

The micrographs on FIG. 5A illustrate the wall with a silicon content of at least 20%. The micrographs on FIG. 5B, by contrast, illustrate the wall with a silicon content of less than 5%. To determine the silicon content in the wall, the wall strength of the base material is compared with the wall strength at the joining point, in particular at the brazing point. The higher the value of the silicon content, the more the base material of the wall is weakened.

LIST OF REFERENCE NUMERALS

1 Device
2 First locating element
3 Second locating element
4 Direction of movement of second locating element 3
5 First thermal insulation of first locating element 2
6 Second thermal insulation of first locating element 2
6a, 6b Second thermal insulation 6 layer
7 Heat source
8 First thermal mass of first locating element 2
9 Second thermal mass of first locating element 2
10 Spacer elements
11 Support element
11a, 11b, 11c Layer of second locating element 3, third thermal mass/insulation of second locating element 3
12 Object
13 Peripheral elements
14 Extraction system
15 First frame element
16 Second frame element
17a, 17b Region of plastic deformation

The invention claimed is:

1. A device for thermal joining of a heat exchanger for a motor vehicle, having a first locating element, a second locating element and at least one heat source,
wherein each of the first and second locating elements have at least one thermal insulation and are configured to mutually align with contact surfaces for arranging an object to be joined between the contact surfaces,
wherein at least one locating element is configured to movably in relation to the other locating element,
wherein the at least one heat source, a first thermal mass and a second thermal mass which are heatable by the at least one heat source are integrated into the first locating element,
wherein the second locating element is comprises a support element with a contact surface for the object,
wherein the first thermal mass of the first locating element comprises a contact surface for the object for heating the object via heat conduction,
wherein the second thermal mass is arranged on the same side of the object with respect to the first thermal mass, the first thermal mass is configured to evenly distribute heat within the object, and the second thermal mass is configured to evenly distribute heat within the first thermal mass;
wherein the first thermal mass and the second thermal mass are plate-shaped,
wherein the first locating element has a first thermal insulation and a second thermal insulation, and
wherein the second thermal insulation is formed of a first layer and a second layer.

2. A device according to claim 1, wherein the at least one heat source is formed of at least one induction coil.

3. A device according to claim 2, wherein the at least one heat source is formed of a plurality of independently controllable induction coils.

4. A device according to claim 1, wherein the at least one heat source is arranged embedded in a thermal insulation of the first locating element.

5. A device according to claim 1, wherein the at least one heat source is arranged between the first layer and the second layer of the second thermal insulation.

6. A device according to claim 1, wherein at least the first thermal mass of the first locating element comprises a flat contact surface for the object to be joined.

7. A device according to claim 1, wherein the second thermal mass is arranged between the first thermal mass and the at least one thermal insulation.

8. A device according to claim 1, wherein the support element of the second locating element is configured as thermal insulation or as thermal mass or as a combination of thermal mass and the at least one thermal insulation.

9. A device according to claim 1, wherein the support element of the second locating element comprises a flat contact surface for the object to be joined.

10. A device according to claim 1, wherein the first locating element is configured immovably in relation to the second locating element and the second locating element is configured to
movably in relation to the first locating element in a direction of movement.

11. A device according to claim 10, wherein the first locating element is arranged in a vertical direction above the second locating element and the second locating element is adjustable in the vertical direction.

12. A device according to claim 10, wherein the contact surfaces of the locating elements in each case are arranged aligned in a horizontal plane.

13. A device according to claim 1, characterised in that on the contact surface of the first thermal mass of the first locating element, spacer elements are arranged, which extend in the direction of the contact surface of the support element of the second locating element, where the dimension of the spacer elements in the direction of the contact surface of the support element of the second locating element corresponds to the height of the object placed on the second locating element after the joining.

14. A method for thermal joining of a heat exchanger for a thermal management system of a motor vehicle, with a device according to claim 1, having the following steps:
switch on a heat source and preheat a first thermal mass of a first locating element of the device,
place elements of an object to be joined touching each other onto a contact surface of a support element of a second locating element,
switch off the heat source or regulate the temperature to compensate for transferred heat and in a thermally contacting manner apply the first thermal mass with a contact surface onto the elements of the object to be joined,
direct heating of the elements of the object to be joined by thermal contact with the adjacent first thermal mass via heat conduction, and
exert planarly applied pressure on the elements of the object to be joined arranged between the contact surfaces by pressing the locating elements together, and
reduce the temperature of the first thermal mass below a predefined value as time progresses,
remove the first thermal mass from the object, and
remove the joined object.

15. A method according to claim 14, wherein the elements of the object to be joined together are provided with a flux before being placed onto the contact surface of the support element.

16. A method according to claim 14, wherein with the switching on of the heat source, the first thermal mass of the support element of the second locating element of the device is heated and that when the elements of the object to be joined are placed onto the contact surface of the support element, the elements of the object and the contact surface of the support element are thermally contacted.

17. A method according to claim 14, wherein in the first thermal mass of the first locating element, a voltage is induced and eddy currents are generated by means of at least one induction coil.

18. A method according to claim 16, wherein in the first thermal mass of the support element of the second locating element, a voltage is induced and eddy currents are generated by means of at least one induction coil.

19. A method according to claim 17, wherein the power of an induction coil or the powers of a plurality of induction coils are controlled independently of each other.

20. A method of manufacturing a heat exchanger comprising thermally joining according to claim 14, wherein the heat exchanger comprises plate elements for a motor vehicle, wherein the heat exchanger is a battery heat exchanger for a thermal management system.

* * * * *